Nov. 2, 1965   B. A. ZMUDA   3,215,145
BEATER GRATE ATTACHMENT FOR THRESHING AND
SEPARATING MECHANISM

Filed June 13, 1963   2 Sheets-Sheet 1

INVENTOR.
B. A. ZMUDA

Nov. 2, 1965  B. A. ZMUDA  3,215,145
BEATER GRATE ATTACHMENT FOR THRESHING AND
SEPARATING MECHANISM
Filed June 13, 1963  2 Sheets-Sheet 2
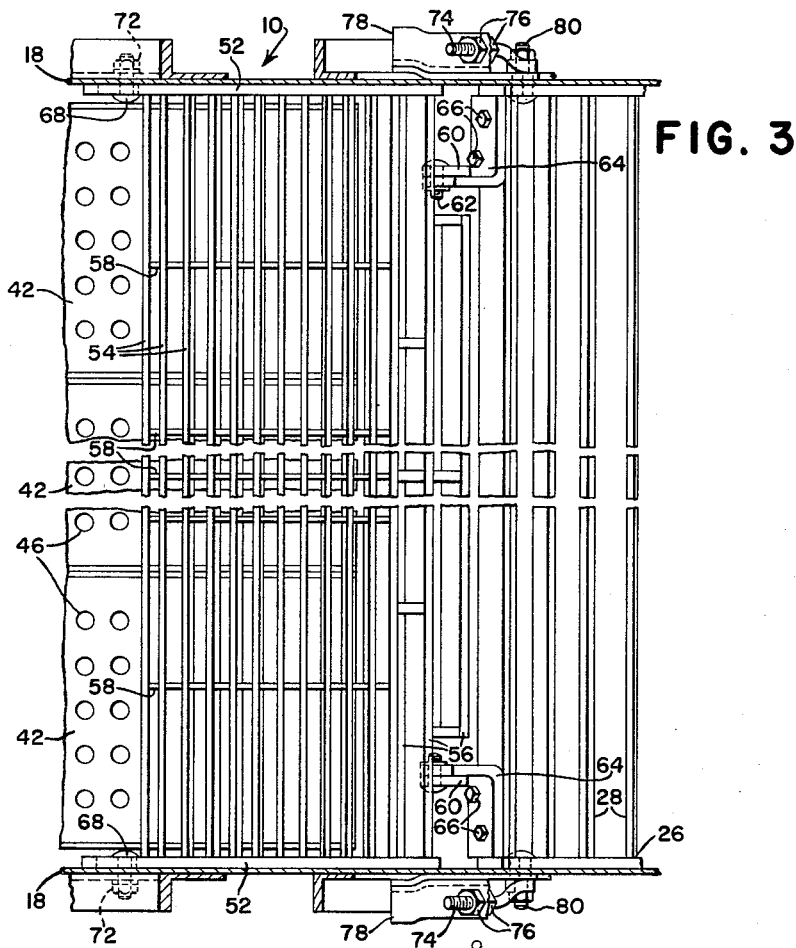
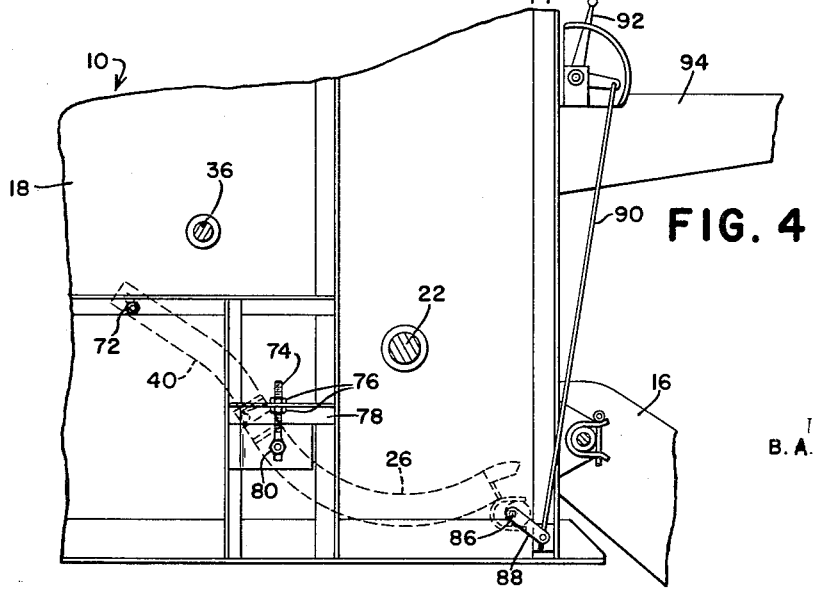
INVENTOR.
B. A. ZMUDA

United States Patent Office 3,215,145
Patented Nov. 2, 1965

3,215,145
BEATER GRATE ATTACHMENT FOR THRESHING AND SEPARATING MECHANISM
Benedict A. Zmuda, East Moline, Ill., assignor to Deere & Company, Moline, Ill., a corporation of Delaware
Filed June 13, 1963, Ser. No. 287,674
4 Claims. (Cl. 130—27)

This invention relates to threshing and separating mechanisms and more particularly to improvements in and by way of a beater grate attachment for association with the threshing cylinder and the beater conventionally employed behind such cylinder.

The conventional combine is normally a self-propelled machine having a separator body including a front feed inlet opening through which the cut grain is fed following its cutting by the header or platform. Immediately rearwardly of the feed opening is a typical threshing cylinder which operates over a curved or arcuate concave to accomplish initial threshing of the grain. The cylinder rotates so that its bottom travels upwardly and rearwardly and passes the threshed grain ultimately to straw receivers, known as straw walkers, assisted by a beater which rotates on an axis parallel to but upwardly and rearwardly from the cylinder axis. Conventional construction further includes a plurality of upwardly and rearwardly extended fingers connected to the rear of the concave and extending upwardly and rearwardly beneath the beater to assist the beater in transferring straw to the straw walkers. Of course, the cylinder does not accomplish complete threshing of the grain from the straw and, depending upon the crop, certain amounts of grain are carried over with the straw to the straw walkers. For this purpose, the straw walkers have perforated bottoms through which the grain can sift directly or indirectly to a shoe or other grain receiver, and ultimately the grain is cleaned and the straw is discharged at the rear of the machine.

It is one of the principal objects of the present invention to replace the plurality of fingers at the rear of the concave with a beater grate which is designed to effect a considerable increase in the separating efficiency of the machine. This is accomplished by giving the beater the added function of separating grain from straw rather than simply controlling straw velocity. It is a feature of the invention that the grate includes transverse baffle members which retard the straw so that the separation of grain by the beater and grate is improved to the end that the first step of the straw walkers or grain receiver is more effective in recovering free grain. A still further feature of the invention resides in the design of the beater grate in such fashion that the fore part thereof, which is attached to the rear of the concave, forms in effect a continuation of the concave to the extent that it is on substantially the same arc as the concave and therefore partially embraces the cylinder, whereas the rear part of the grate is reversely curved to conform generally to the shape of the beater or to the cylinder generated by the rotation of the beater. The invention includes as another object thereof means for mounting the beater grate on the rear of the concave and more particularly improved mounting means enabling the beater grate to accommodate itself to variations in the position of the concave as same is adjusted toward and away from the cylinder. A still further object of the invention is to provide a beater grate attachment which may be used in existing machines as well as one that may be furnished as original equipment.

The foregoing and other important objects and desirable features inherent in and encompassed by the invention will become apparent as the preferred embodiment thereof is disclosed in detail in the ensuing description and accompanying sheets of drawings, the figures of which are described below.

FIG. 3 is a plan view, with portions broken away and other portions in section, as would be seen generally along the line 3—3 of FIG. 2.

FIG. 4 is an elevational view, partly in section, of the exterior of the combine and illustrating a typical means for adjusting the cylinder concave.

Figure 1:
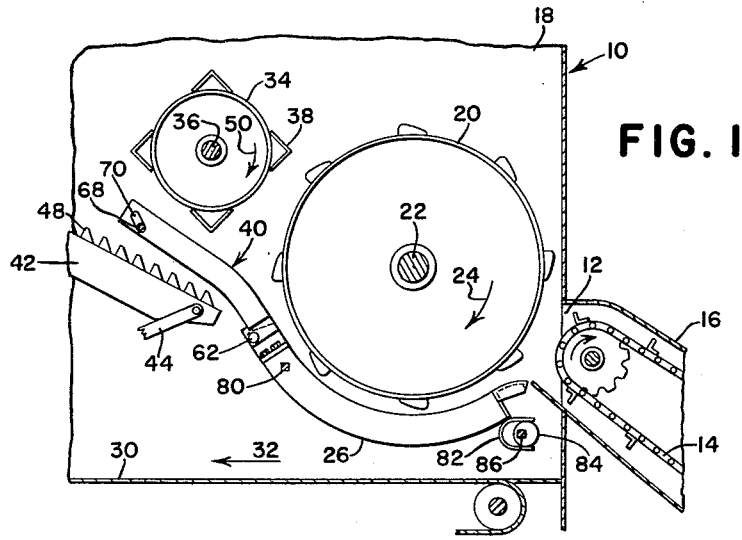
FIG. 1 is a fragmentary small-scale view, partly in section, of the fore part of a typical combine, illustrating certain of the threshing and separating components significantly affected by the improved beater grate attachment.

The numeral 10 designates the fore part of a typical separator body such as employed in the conventional combine, having at its front end in a transverse wall thereof a feed inlet opening 12 which is fed by a conveyor 14, of the undershot type, contained in a typical feeder house 16. The body 10 has opposite side walls 18 which are spanned just rearwardly of the feed opening 12 by a conventional rotatable threshing cylinder 20, carried for rotation on a transverse shaft 22 which has its opposite ends journaled in any suitable manner (not shown) in the body side walls 18. The normal direction of rotation of the cylinder is designated by the arrow 24.

Disposed below the cylinder is a conventional concave 26, typically of arcuate configuration to conform generally to the cylinder and having therein a plurality of transverse concave bars 28 with which the cylinder cooperates to perform the usual threshing function. Grain passing through the openings between the bars 28 falls on a grain receiver, here in the form of a belt conveyor 30, the top run of which travels rearwardly as shown by the arrow 32 in FIG. 1. This conveyor may lead to the usual grain shoe or other cleaning mechanism (not shown) as will be familiar to those versed in the art.

Also spanning the side walls 18 of the body is a rotatable beater 34 carried on a transverse beater shaft 36 which, like the cylinder shaft 22, may be journaled at its opposite ends in the body side walls. The axis of the shaft 36 is located to the rear and at a level above that of the cylinder shaft 22, as is typical. In this case, the periphery of the beater is shown as being provided with a plurality of transverse beater blades 38, but this is merely representative of many forms of beater structures, since other types may be used, such as the well-known spike-type tooth design. Likewise, the nature of the cylinder, shown here as of the rasp-bar type may be altered.

Figure 2:
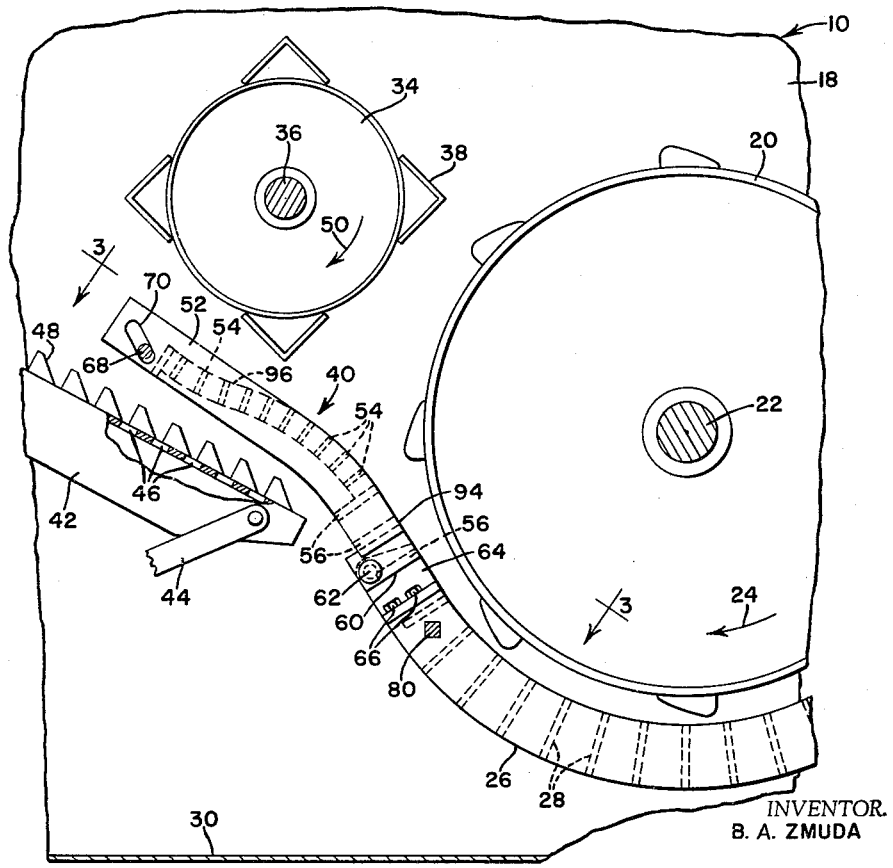
FIG. 2 is an enlarged view of a portion of FIG. 1, illustrating in greater detail the configuration of the beater grate attachment and its relationship to the other components.

Just below the beater is the novel beater grate attachment designated in its entirety by the numeral 40. In threshing and separating mechanisms of the prior art, a finger bar assembly is located in this area, consisting of a plurality of transversely spaced fore-and-aft extending fingers, the purpose of which is to cooperate with the beater in accomplishing the transfer of threshed or partially threshed straw from the cylinder to a straw receiver, represented here by a plurality of straw walkers 42. Such walkers are conventionally mounted for forwardly downhill and rearwardly uphill reciprocation as by being mounted on cranks 44. The walkers are perforated in their bottoms, as shown here at 46 (FIGS. 2 and 3), to enable grain to escape to the grain receiver as represented here by the conveyor 30. Only a few of these apertures are shown in FIG. 3 in the interests of brevity and clarity. The straw is normally retained by the walkers and ultimately, because of reciprocation or oscillation of the walkers, is conveyed upwardly and rearwardly and ultimately escapes at the rear of the machine. The walkers 42 shown here are illustrated as having the conventional teeth or "fishback" construction, denoted at 48.

The direction of rotation of the beater 34 is shown by the arrow 50.

The beater grate or beater grate attachment comprises essentially a pair of fore-and-aft side bars 52 rigidly cross-connected by a plurality of elongated transverse bars or baffle members 54, supplemented at the fore part by three additional transverse bars 56. The bars 54 and 56 are rigidly joined to the side bars 52 as by welding. The structure is augmented by a few fore-and-aft brace members 58, which may also be welded in place.

The fore part of the grate 40 is provided with means for affixing same to the rear of the concave 26 and to this end one of the bars is provided adjacent to each side of the grate with a rigid ear 60 which, by means of a pivot means such as a bolt 62, is connected to a bracket 64 that is in turn bolted to the rear bar of the concave as by cap screws 66. The brackets 64 in effect become a rigid part of the concave whereas the pivot bolts 62 serve to mount the grate 40 pivotally to the concave, for purposes to presently appear.

The rear part of the grate 40 is mounted to the side walls 18 of the body 10 by connection means, one at each side of the structure and each comprising a bolt 68 passed through a slot 70 in the associated side bar 52 and through an appropriate aperture in the body side wall 18, being fitted exteriorly with a nut 72. The slot 70 is inclined downwardly and forwardly, which enables the grate 40 to accommodate itself to adjustment of the concave which is carried at its rear end for vertical adjustment exteriorly of the body by means of an eye-bolt 74 and associated lock nuts 76 cooperative with an angle member 78, which may be part of the body framework (FIG. 4). The connection of the eye-bolt to the concave is effected at 80. The forward end of the concave is provided at each side with a forwardly opening U-shaped member 82 which receives an adjusting cam 84 mounted on a transverse rockshaft 86 carried by the side walls 18. Exteriorly of the machine, the rockshaft 86 carries an arm 88 which is connected by a link 90 to a control bell crank 92 adjacent to an operator's platform 94 as shown fragmentarily in FIG. 4. It will be seen that rocking of the bell crank 92 turns the rockshaft 86 and thus causes adjustment of the fore part of the concave toward and away from the cylinder, the concave swinging about the pivot established by the coaxial connections 80. As this type of adjustment takes place, the grate 40 of course moves, but the slots 70 accommodate this. Also, the rear part of the concave may be adjusted relative to the fore part by adjusting the nuts 76, in which case the rear part of the concave swings about a forward axis established at the cams 84, and again the slots 70 in the grate 40 accommodate this adjustment.

In operation, grain is taken into the front of the separator via the inlet 12 as supplied by the feeder conveyor 14. The cylinder 20, rotating in the direction of the arrow 24, performs its usual threshing function in cooperation with the concave 26, the threshed grain dropping to the conveyor 30 for transfer rearwardly (arrow 32) to the cleaning mechanism (not shown). The straw from which the grain has been threshed travels upwardly over the beater grate 40 and thence onto the straw walkers 42. However, the significant factor here is that the beater grate 40 has the transverse baffle members or bars 54, as distinguished from the fore-and-aft free-end fingers in prior art constructions. This is not only a difference in structure but also furnishes significant differences in results, primarily increasing the threshing efficiency of the machine, because the velocity of the straw is retarded and the beater is given the additional function of threshing from this straw any grain that has escaped the threshing action of the cylinder. This grain drops primarily downwardly to the conveyor 30; although, any portion thereof that encounters the fore part of the straw walkers 42 sifts through the straw walker openings 46 and thence to the conveyor. As previously described, the straw is carried rearwardly and ultimately discharged at the rear of the machine. Another important feature of the grate 40 is that the fore part thereof is substantially a continuation of the arc of the concave, notably in the area designated by the numeral 94, whereas the rear part is reversely curved to conform generally to the beater 34, as at 96. The grate and therefore the baffles are thus disposed in a relatively flat S-curve including a rearward arcuate portion beneath and generally concentric to the beater and a forward portion curving forwardly and then downwardly in close proximity to the lower rearward portion of the cylinder and in substantially tangential relationship to the rear end of the concave. Augmenting the characteristic of the fore part of the grate 40 is the fact that the first three bars 56 are in effect three additional bars to the concave, which improves the threshing function. Also, these bars give proportionately more area for free grain to be removed from the straw and chaff, which grain falls through the concave and thence to the grain receiver as represented here by the conveyor 30, in which respect it should be noted that any other type of grain receiver may be used, that shown here being merely representative.

The remaining bars 54 of the grate 40 establish a series of baffles which deflects free grain which may leave the threshing cylinder at high velocity, causing this grain to drop ultimately to the cleaning mechanism without being carried rearwardly over onto the straw walkers. The fingers of the conventional concave extension would be parallel to the travel of the grain and would not give this result. The beater grate is essentially a perforated platform beneath the beater and the beater in effect is given the additional function of a threshing cylinder. With the threshing function improved, the volume of grain carried over to the straw walkers and to be ultimately recovered is considerably reduced. Moreover, the baffles, being transverse to the line of travel of the material, also retard the straw so that it can be threshed by the beater. The beater is, however, still able to perform its usual function in controlling straw velocity and ultimately moving the straw to the walkers.

Features and advantages other than those enumerated above will readily occur to those versed in the art, as will many modifications and alterations in the preferred embodiment disclosed, all of which may be achieved without departure from the spirit and scope of the invention.

What is claimed is:

1. In threshing and separating apparatus including a body having spaced apart side walls journaling a threshing cylinder on a transverse axis for rotation over a normally fixedly positioned concave supported at its front and rear ends for selective adjustment toward and away from the cylinder and a rotatable beater journaled by the walls rearwardly and upwardly of and parallel to the cylinder, the improvement comprising a beater grate disposed beneath the beater and having front and rear ends, opposite fore-and-aft sides and a plurality of transverse baffles spaced apart fore and aft to provide a plurality of grain discharge openings, said grate being of rigid construction both fore and aft and transversely and having its front end closely adjacent to the rear end of the concave, said baffles lying in a relatively flat S-curve including a rearward arcuate portion beneath and generally concentric to the beater and a forward portion curving forwardly and then downwardly in close proximity to the lower rearward portion of the cylinder and in substantially tangential relationship to the rear end of the concave; and front and rear mounting means connecting the front and rear ends of the grate respectively to the rear end of the concave and to the body walls for normally fixing the position of the grate as an upward and rearward operationally rigid extension of the concave, said front mounting means including a joint providing a transverse pivot in close proximity to the aforesaid tangential relationship and normally fixing the position of the grate but enabling relative rocking of the grate and concave when the concave is adjusted and said rear mounting means including mechanism normally effective to fix the position of the grate but operative, when the concave is adjusted to enable both fore-and-aft and up-and-down shifting of the grate.

2. The invention defined in claim 1, in which: the rear mounting means includes, at each side of the grate and the associated body wall, a pin and slot connection wherein the slot is inclined rearwardly uphill and forwardly downhill.

3. The invention defined in claim 1, in which: the forward portion of the grate includes transverse members similar to those in the concave.

4. The invention defined in claim 1, in which: the front mounting means includes a pair of transversely spaced brackets affixed to the rear of the concave and a pair of similarly transversely spaced ears on the grate and pivoted respectively to the brackets to provide the aforesaid pivot.

References Cited by the Examiner
UNITED STATES PATENTS

| | | | |
|---|---|---|---|
| 811,025 | 1/06 | Baker | 130—24 |
| 885,620 | 4/08 | Huff | 130—27.11 |
| 1,625,365 | 4/27 | Inghram | 130—27.10 |
| 2,577,329 | 12/51 | Irvine | 130—27.11 |

ANTONIO F. GUIDA, *Primary Examiner.*

T. GRAHAM CRAVER, *Examiner.*